Aug. 4, 1964 L. H. BLOODWORTH ETAL 3,143,668

POWER SAVING SWITCH DRIVER SYSTEM

Filed July 12, 1962 2 Sheets-Sheet 1

INVENTORS.
LOY H. BLOODWORTH
KENNETH E. WOOD
BY H. H. Losche
Paul S. Colligon
ATT'YS.

POWER SAVING SWITCH DRIVER SYSTEM

Filed July 12, 1962 2 Sheets-Sheet 2

INVENTORS
LOY H. BLOODWORTH
KENNETH E. WOOD
BY H. H. Losche
Paul S. Collignon
ATT'YS.

United States Patent Office 3,143,668
Patented Aug. 4, 1964

3,143,668

POWER SAVING SWITCH DRIVER SYSTEM

Loy H. Bloodworth, Baltimore, and Kenneth E. Wood, Severna Park, Md., assignors, by mesne assignments, to the United States of America as represented by the Secretary of the Navy Filed July 12, 1962, Ser. No. 209,480
4 Claims. (Cl. 307—88.5)

Figure 1:
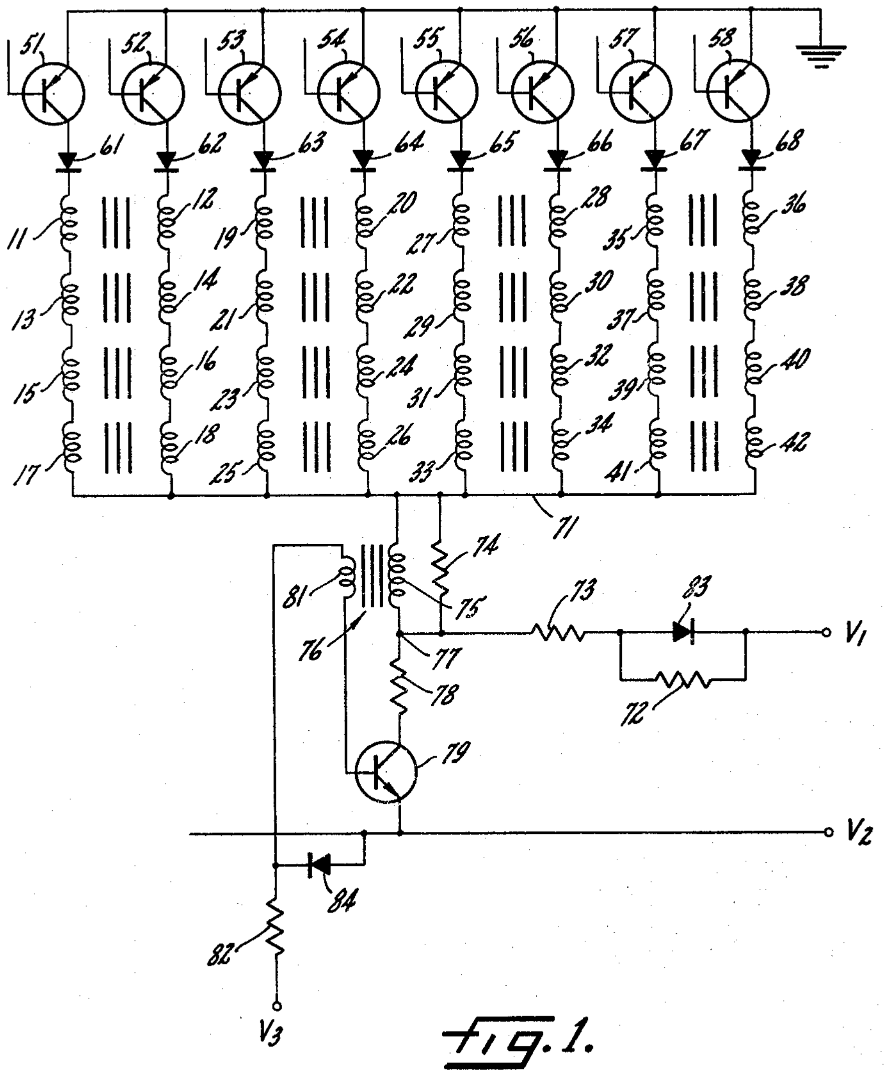

The present invention relates to a power saving driver system for driving a binary switching system.

In one type of binary ferrite switching system, a single RF input is routed to one of a plurality of outputs. The system is so arranged that only one switch driver in any level is operated at a given time thereby providing a unique path from the input to one of the plurality of outputs. The microwave power is routed in each of the switches according to whether a current flows in a surrounding coil in one direction or in the other. The insertion loss in the conducting direction is dependent on the strength of the applied current. During the switching period, a relatively high volt-amp product is required and thereafter, during the holding period, the voltage across the coil falls to a small IR value. In general, the switching time is small compared to the total holding time.

Heretofore, a power supply has been required that is much larger than the holding voltage in order to provide the current for overcoming the switching voltage during the relatively short switching period. The continual drain of the holding current of several amperes from the relatively high voltage is a waste of power.

In the present invention, each driver consists basically of a P-N-P power switch, and a plurality of switching coils are connected in series with each collector and a common bus bar. The common bus bar is connected through a crystal diode to a source of low voltage and also through an electronic switch to a source of relatively high voltage. The application of a base drive to any one of the drivers results in a current flow in the electronic switch which operates like a collector triggered blocking oscillator. This connects the source of high voltage through a timing resistor to the switching coils. The source of high voltage remains connected for a time slightly longer than that required for the RF switch to change. When the source of high voltage is disconnected from the switching coils, the source of low voltage is simultaneously connected to provide the necessary holding current.

It is therefore a general object of the present invention to provide a new and improved binary switching system.

Another object of the present invention is to provide a binary switching system that will conserve power.

Still another object of the present invention is to provide a binary switching system that will be connected to a low voltage supply during a holding period and will automatically switch to be connected to a relatively high voltage supply during a switching period.

Figure 2:
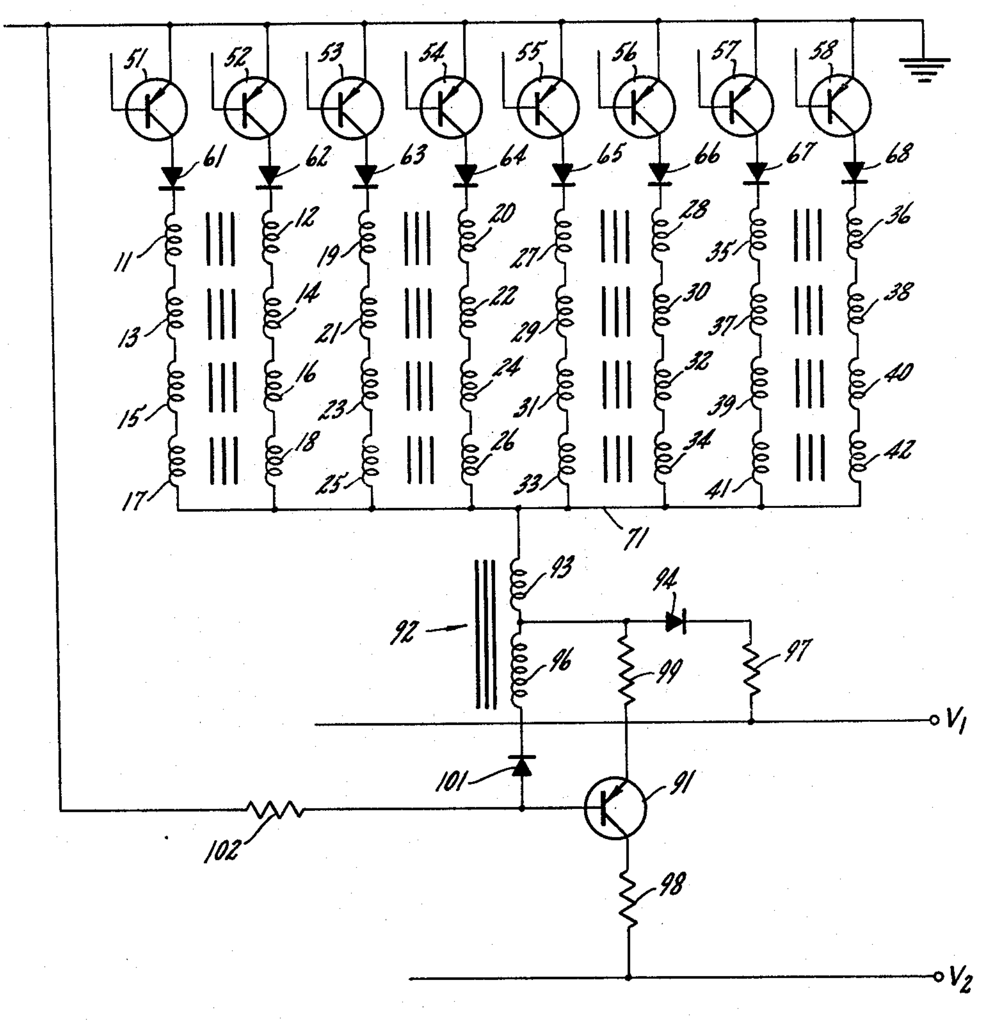

Other objects and advantages of the present invention will be readily appreciated as the same becomes better understood by reference to the following detailed description when considered in connection with the accompanying drawings in which like reference numerals designate like parts throughout the figures thereof and wherein:

FIGURE 1 is a schematic circuit diagram showing one embodiment of the present invention; and FIGURE 2 is a schematic circuit diagram showing another embodiment of the present invention.

Referring now to FIGURE 1 of the drawings, there is illustrated an embodiment of the present invention having thirty-two switch coils (numbered 11 through 42). In order to reduce the number of parts and also in order to conserve space, four coils are driven by each driver and also the coils are wound in pairs on cores, but in opposite directions. For example, coils 11 and 12 are wound on the same core.

Drivers 51 through 58 are provided and, by way of example, these are P-N-P transistors that have the customary emitter, collector, and base electrodes. The emitter electrodes of the drivers are connected to ground and the base electrodes are connected to separate inputs and arranged such that only one driver can be conducting at a time. The collector electrode of each transistor is connected through a diode to a group of series-connected coils that are connected to a common bus bar 71. A supply of low voltage ($V_1$), which by way of example might be −8 volts, is connected through resistors 72, 73, and 74 to the common bus bar 71. The primary winding 75 of a transformer 76 has one end connected to bus bar 71 and the other end of winding 75 is connected through junction point 77 and resistor 78 to the collector electrode of an N-P-N transistor 79. The secondary winding 81 of transformer 76 has one end connected to the base electrode of transistor 79 and the other end of winding 81 is connected through resistor 82 to a source of biasing voltage $V_3$. The emitter electrode of transistor 79 is connected to a source of high voltage $V_2$, which by way of example might be −50 volts. The low voltage source $V_1$ is connected through diode 83, and resistors 72 and 73 to junction point 77.

In operation, when all the drivers 51 through 58 are cut off, transistor 79 is also off and the common bus line 71 is approximately at $V_1$ volts by virtue of the high resistance value of resistor 72. (The value of resistor 72 is chosen so that it will be greater than the combined resistance value of resistors 73 and 74.) Thus the lower value of $V_1$ is applied to coils 11 through 42 to provide a holding current during the static conducting period.

Assuming now that a switching signal is applied to transistor 51, initial current flows through coils 11, 13, 15, and 17, transformer 76, resistor 73, and diode 83. This rising current causes an induced voltage in the secondary winding 81 of transformer 76 to start to turn on the N-P-N transistor 79. Further regeneration causes transistor 79 to become low impedance. All of this occurs a few microseconds after the initial switching signal is applied to transistor 51 and the current through resistor 78 has not had a chance to build up. The voltage at junction point 77 therefore falls and thus disconnects the low voltage supply $V_1$ from the bus bar 71. The relatively high voltage supply $V_2$ is thus connected to bus bar 71 while transistor 79 is conducting, and the elements of the blocking oscillator are chosen and arranged so that transistor 79 conducts for a period slightly greater than the time required for switching. At the end of this period, the voltage at junction point 77 has risen to the voltage of $V_1$, and when transistor 79 turns off the coils are again drawing current from the source of low voltage $V_1$.

Referring now to FIGURE 2 of the drawings, there is shown an embodiment similar to the embodiment of FIGURE 1, however, a P-N-P transistor 91 and autotransformer 92 are used in the blocking oscillator. In operation, when one of the drivers is energized by a switching signal, current begins to flow through the ferrite coils, bus bar 71, primary winding 93, diode 94, and resistor 97 to source $V_1$. The changing current in primary winding 93 induces a voltage in secondary winding 96 and thus turns on transistor 91. The high voltage source $V_2$ is now connected to bus bar 71 and the coil current rises rapidly and holds transistor 91 on until the combined effect of the drop across resistor 97 and the degeneration of resistor 98 is sufficient to overcome the regeneration of the secondary winding 96. At this time, transistor 91 turns off and the coil current continues at a steady value through diode 94 and resistor 97 to $V_1$. The value of the coil current is determined mainly by the value of resistor 97. Resistor 98 is provided to control the rise time and peak value of the current and resistor 99 is provided to control the overshoot of the current above the desired steady value of current. Diode 101 and resistor 102 are provided for setting the proper bias on transistor 91.

From the foregoing description it can be seen that the present invention provides a new and improved power saving device for use in binary switching systems.

Obviously many modifications and variations of the present invention are possible in the light of the above teachings. It is therefore to be understood, that within the scope of the appended claims, the invention may be practiced otherwise than as specifically described.

What is claimed is:

1. A power saving switch driver system comprising:
a plurality of switch drivers,
a bus bar,
a plurality of switch coils connected between each of said switch drivers and said bus bar,
a source of low voltage connected to said bus bar,
a source of high voltage, and
switching means for simultaneously connecting said source of high voltage to said bus bar and disconnecting said source of low voltage when any one of said switch drivers is energized, said switching means comprising a transformer having primary and secondary windings and an N-P-N transistor having base, emitter, and collector electrodes, one end of said primary winding being connected to said bus bar and the other end of said primary winding being connected through a resistance element to said collector electrode, one end of said secondary winding being connected to said base electrode and the other end of said secondary winding being connected to a biasing voltage source, and said emitter electrode being connected to said source of high voltage.

2. A power saving switch driver system as set forth in claim 1 wherein each of said plurality of switch drivers is a P-N-P transistor.

3. A power saving switch driver system comprising:
a plurality of switch drivers,
a bus bar,
a plurality of switch coils connected between each of said switch drivers and said bus bar,
a source of low voltage connected to said bus bar,
a source of high voltage, and
switching means for simultaneously connecting said source of high voltage to said bus bar and disconnecting said source of low voltage when any one of said switch drivers is energized, said switching means comprising an autotransformer having primary and secondary windings connected together at a junction point, and a P-N-P transistor having emitter, collector and base electrodes, one of said primary winding being connected to said bus bar and one end of said secondary winding being connected through a crystal diode to said base electrode, said emitter electrode being connected through a resistance element to said junction joint and said collector being connected through a resistance element to said source of high voltage.

4. A power saving switch driver system as set forth in claim 3 wherein each of said plurality of switch drivers is a P-N-P transistor.

References Cited in the file of this patent

UNITED STATES PATENTS

| | | |
|---|---|---|
| 2,764,715 | Lorenz | Sept. 25, 1956 |
| 2,798,205 | Hogan | July 2, 1957 |
| 2,810,080 | Trousdale | Oct. 15, 1957 |
| 2,850,648 | Elliott | Sept. 2, 1958 |
| 2,861,199 | Henle | Nov. 18, 1958 |
| 2,906,974 | Reggia et al. | Sept. 29, 1959 |
| 2,939,119 | Einsele | May 31, 1960 |
| 3,032,749 | Newhouse | May 1, 1962 |
| 3,091,741 | Eisaman et al. | May 28, 1963 |
| 3,094,689 | Walstrom | June 18, 1963 |
| 3,116,441 | Gieffers | Dec. 31, 1963 |